United States Patent [19]

Anderson

[11] Patent Number: 5,738,285
[45] Date of Patent: Apr. 14, 1998

[54] SECONDARY SEAL FOR THE PNEUMATIC DISCHARGE NOZZLE OF A COVERED HOPPER CAR

[75] Inventor: John D. Anderson, Aurora, Ill.

[73] Assignee: Zeftek, Inc., Montgomery, Ill.

[21] Appl. No.: 521,468

[22] Filed: Aug. 30, 1995

[51] Int. Cl.[6] ............... A01C 00/00; F16L 55/10; B65D 51/18
[52] U.S. Cl. ............. 239/654; 137/800; 138/89; 138/96 R; 220/256; 220/789; 222/545
[58] Field of Search .................. 239/654, 548; 222/543, 545, 542; 137/800; 138/89, 89.1, 89.2, 89.3, 96; 220/254, 256, 789, 801, 802; 215/303, 306, 355, 320

[56] References Cited

U.S. PATENT DOCUMENTS

| | | | |
|---|---|---|---|
| 1,947,915 | 2/1934 | Marschall | 222/542 X |
| 2,760,683 | 8/1956 | Diether | 222/543 X |
| 4,228,823 | 10/1980 | Zepeda | 138/96 R |
| 4,902,173 | 2/1990 | Hendee et al. | 406/145 |

FOREIGN PATENT DOCUMENTS

| | | | |
|---|---|---|---|
| 610820 | 12/1960 | Canada | 222/545 |
| 558152 | 2/1957 | Italy | 222/542 |

Primary Examiner—Andres Kashnikow
Assistant Examiner—Robin O. Evans
Attorney, Agent, or Firm—Lloyd L. Zickert

[57] ABSTRACT

A secondary seal in the form of a plug member insertable in the open end of a pneumatic discharge nozzle of a covered hopper car carrying granular material, such as plastic pellets, wherein the plug member includes means for maintaining the pellets in spaced relation to the open end of the nozzle to prevent spillage when the plug member is removed, and having retaining means connecting the plug member to the nozzle when it is removed from the open end of the nozzle.

7 Claims, 4 Drawing Sheets

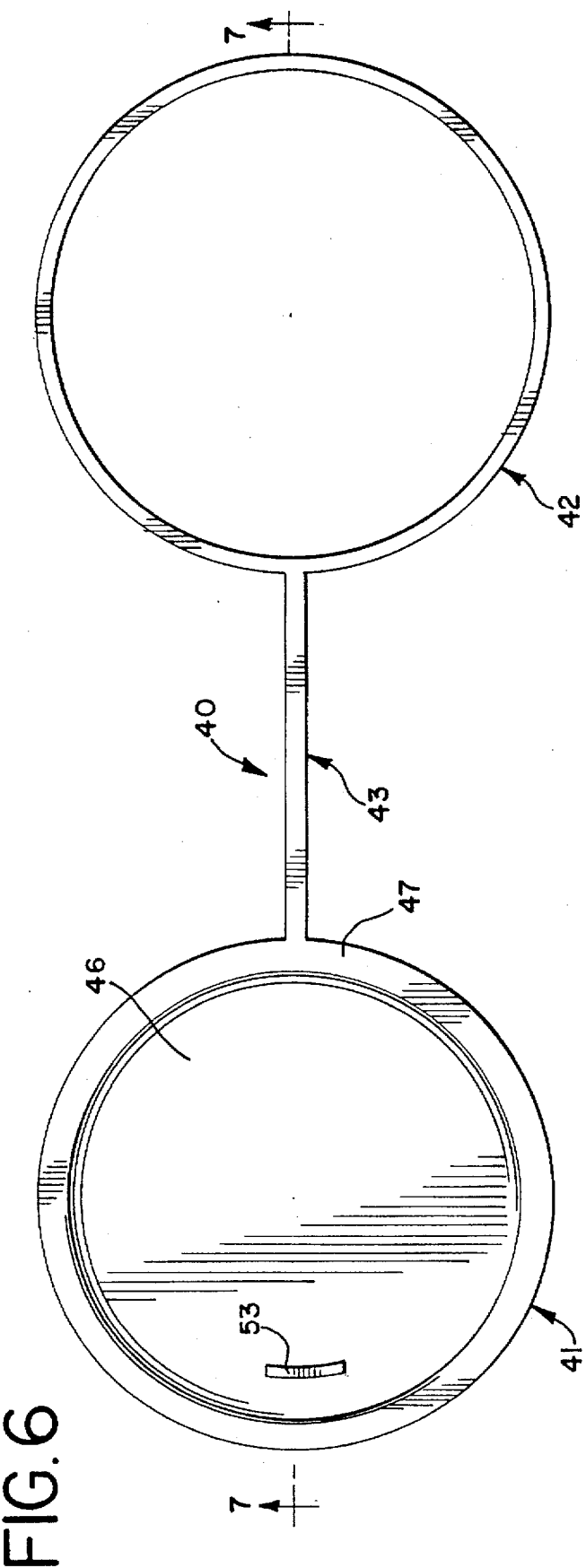
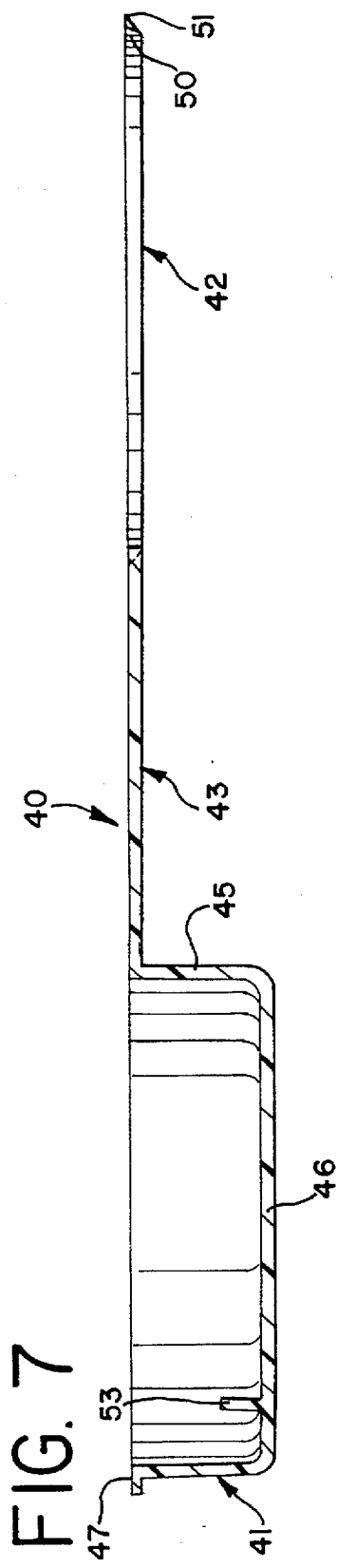
FIG. 6
FIG. 7

5,738,285

SECONDARY SEAL FOR THE PNEUMATIC DISCHARGE NOZZLE OF A COVERED HOPPER CAR

This invention relates in general to a secondary seal for a pneumatic discharge nozzle of a covered railway hopper car which transports a granular product such as plastic pellets, and more particularly to a secondary seal capable of preventing spillage when removed from the discharge nozzle and being connected to the nozzle to avoid discard at the track site.

BACKGROUND OF THE INVENTION

Heretofore, it has been known to provide a secondary seal for a covered hopper car carrying pelletized plastic, wherein the seal is in the form of a plug which is mounted at the open end of a pneumatic discharge nozzle on the car. The plug is in the form of a molded plastic member that fits in the open end of a discharge nozzle and is removed prior to attachment of a hose or pipe for pneumatically unloading the car and conveying the contents to a receiving container or receptacle for further transporting or use. This plug, when removed, may allow the spillage of pelletized material from the nozzle inasmuch as material can build up behind the plug during travel of the car along a rail line. Such spillage onto a track site, particularly of plastic resin pellets, is considered to pollute the ground at the site. In order to avoid such pollution, a collecting container has been placed below the end of the nozzle to collect the spillage. But such a method for preventing spillage is not always practical or used by the unloader. Moreover, the plastic plug member is usually discarded at the track site which adds to the pollution of the site.

SUMMARY OF THE INVENTION

The present invention overcomes the pollution problems heretofore encountered as well as the need to utilize a container below the open end of the discharge nozzle of a hopper car, particularly inasmuch as such a container is infrequently available. The present invention relates to a secondary seal member that not only prevents spillage of the pelletized material from the open end of the pneumatic nozzle when it is opened for unloading purposes, but also to prevent discarding of the plug member at the track site.

A covered hopper car utilizes a pneumatic discharge nozzle adjacent the bottom of the car adjacent the track bed. The nozzle extends in a horizontal direction and is used to connect with a pipe or hose for delivering the contents of the car to a work station for use or a container for further shipment by road. While a valve or gate is provided ahead of the end of the discharge nozzle to prevent the contents of the car from feeding to the nozzle until it is desired to unload the car, due to the tolerance fit of the gate or valve, some leakage of pellets occurs around the valve or gate that allows some build-up of plastic pellets in the horizontally disposed discharge nozzle. For this reason, a plug and an outlet cap are used to close off the end of the nozzle. The plug member prevents the plastic pellets from moving outwardly through the open end of the nozzle, while an outlet cap serves to further prevent loss of pellets and hold the plug member in place during shipping of the car. When reaching a discharge station, the outlet cap is first removed and then the plug is removed before attaching a pipe or hose for discharge of the pellets to a receiving container or site. The plug serves as a secondary seal for the discharge nozzle. The secondary seal of the present invention includes means for maintaining the plastic pellets leaking into the discharge nozzle from building up at the very end of the nozzle. Thus, when the plug member is removed, the plastic pellets, while possibly moving some distance toward the outlet end of the nozzle, will not move to the very end and spill out onto the ground at the track site.

Further, the secondary seal of the present invention is connected by a tether or link to the discharge nozzle so that it cannot be discarded at the track site. Previously, such plug members not being retained on the discharge nozzle are removed and discarded at the track site which causes a pollution problem.

A further feature of the present invention is that the secondary seal includes an attachment ring with the tether for maintaining the plug member in associated relationship with the discharge nozzle. The attached ring fits over the discharge nozzle and is formed such as to provide an auxiliary seal between the discharge nozzle and the outlet cap that is used to further protect against the loss of product from the discharge nozzle. This auxiliary seal would prevent the loss of pellets should they be in the outlet cap as well as to prevent the weather from reaching the end of the discharge nozzle.

It is therefore an object of the present invention to provide a new and improved secondary seal for the pneumatic discharge nozzle of a covered hopper car carrying pelletized material that obviates environmental pollution.

A further object of the present invention is in the provision of a secondary seal having a plug member for a pneumatic discharge nozzle of a covered railway hopper car which prevents environmental pollution by preventing the spillage of plastic pellets from the discharge nozzle upon removal of the plug member and further by tethering the plug member to the discharge nozzle to prevent it from being discarded at the track site.

A still further object of the present invention is to provide a secondary seal that is tethered to the discharge nozzle of a covered hopper car and where it includes an auxiliary seal for coacting with the outlet cap to further protect against leakage of product from the discharge nozzle.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 6 is a plan view of the secondary seal of the present invention before it is installed on a discharge nozzle;

FIG. 7 is a sectional view of the secondary seal of FIG. 6 taken substantially along line 7—7 of FIG. 6;

DESCRIPTION OF THE INVENTION

Figure 1:
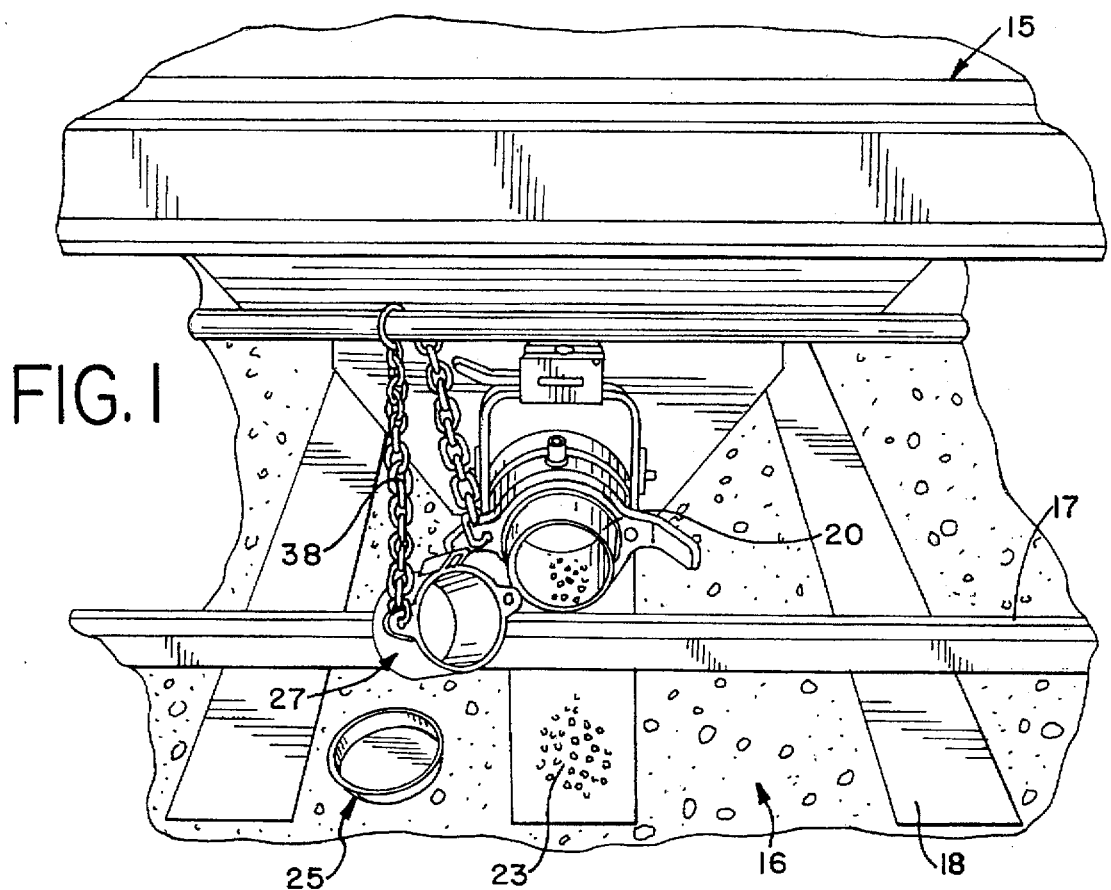
FIG. 1 is a fragmentary perspective view of the lower discharge area of a covered hopper car at a track site and illustrating the environmental pollution problem caused by the prior art secondary seal.

Referring now to the drawings, and particularly to FIG. 1, the covered railway hopper car 15 is shown at a track site 16 where the car may be unloaded of its contents. It will be understood the contents may be transferred to an over-the-road vehicle for further shipment or to a plant facility for processing. While not completely shown, it will be understood that the car includes supporting wheels engaging the track 17 which in turn are supported on ties 18 in a suitable roadbed.

At the lower end of the hopper car, in order to facilitate unloading of the contents of the car, a pneumatic discharge nozzle 20 is provided for suitable attachment to a pipe or hose (not shown) that would extend to a container or hopper into which the contents of the hopper car are to be discharged. It will also be understood, although not shown, a suitable valve or gate will be provided at a lower outlet of the hopper car ahead of the discharge nozzle to prevent the contents from going into the discharge nozzle until it is desired to unload the contents of the car. Pelletized products, such as plastic pellets 22, in the mouth end of the discharge nozzle may spill onto the track site, as indicated at 23, when the plug member 25 is removed from the nozzle. It is the spillage of plastic pellets onto the track site that is intended to be avoided by the present invention.

Although the valve or gate between the discharge nozzle and the hopper car is normally closed until it is desired to unload the contents of the hopper car, there will be a leakage which will cause some plastic pellets to go into the area of the discharge nozzle. Heretofore, the shallow plastic plug member 25 has been used at the open end of the nozzle as a secondary seal, since as below explained a seal is provided for the outlet cap. This secondary seal prevents pellets from moving into the outlet cap. Because heretofore secondary seals have been so shallow, they would allow any plastic pellets going into the discharge nozzle to be very near the open end of the nozzle, such that upon removal of the plug member, pellets would spill out onto the track site as indicated by the pellet pile 23. Also, the plastic plug member 25 would normally be discarded at the track site and, together with the spillage of plastic pellets, environmentally pollute the track site. The secondary seal of the present invention overcomes this environmental pollution problem.

An outlet cap 27 is provided to close off and cover the discharge nozzle 20 during the travel of the hopper car. The outlet cap is made of a suitable steel or plastic and also coacts with a seal member on the discharge nozzle when the cap is mounted on the discharge nozzle. As seen particularly in FIG. 2, the cap includes a cylindrical side wall 28 and an end wall 29. Additionally, ears 30 are provided to facilitate the connecting of the outlet cap to the discharge nozzle and particularly to the arms 31 carried by the nozzle. Other forms of outlet cap may be provided.

Figure 4:
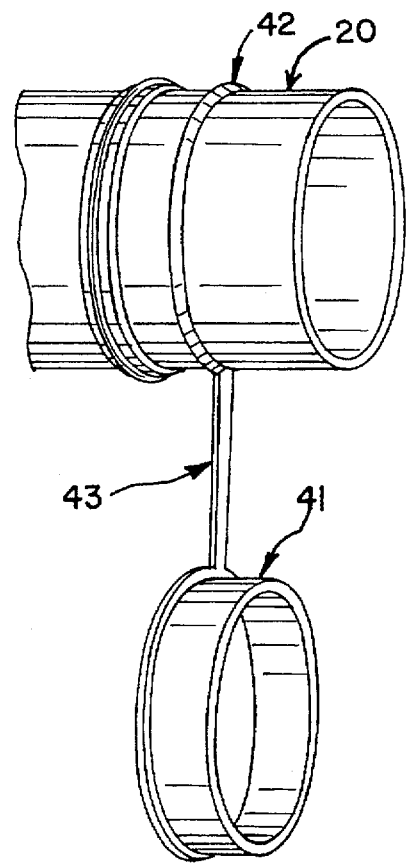
FIG. 4 is a vertical cut-away view of the assembly of FIG. 3 illustrating in section the discharge nozzle outlet cap and the secondary seal of the invention.

The discharge nozzle includes an outlet end 32 at the terminal edge 33 and an annular groove 34 at the base of the nozzle which receives an O-ring gasket or sealing member 35, as seen in FIG. 4. When the outlet cap 27 is mounted on the discharge nozzle 20, the cylindrical side wall 28 of the outlet cap coacts with the O-ring gasket or seal 35 to seal the outlet cap with respect to the nozzle.

As seen in FIG. 1, suitable chain means 38 is provided to retain the outlet cap 27 at the discharge nozzle when it is removed from the end of discharge nozzle 20 to open the nozzle for unloading purposes.

Figure 2:
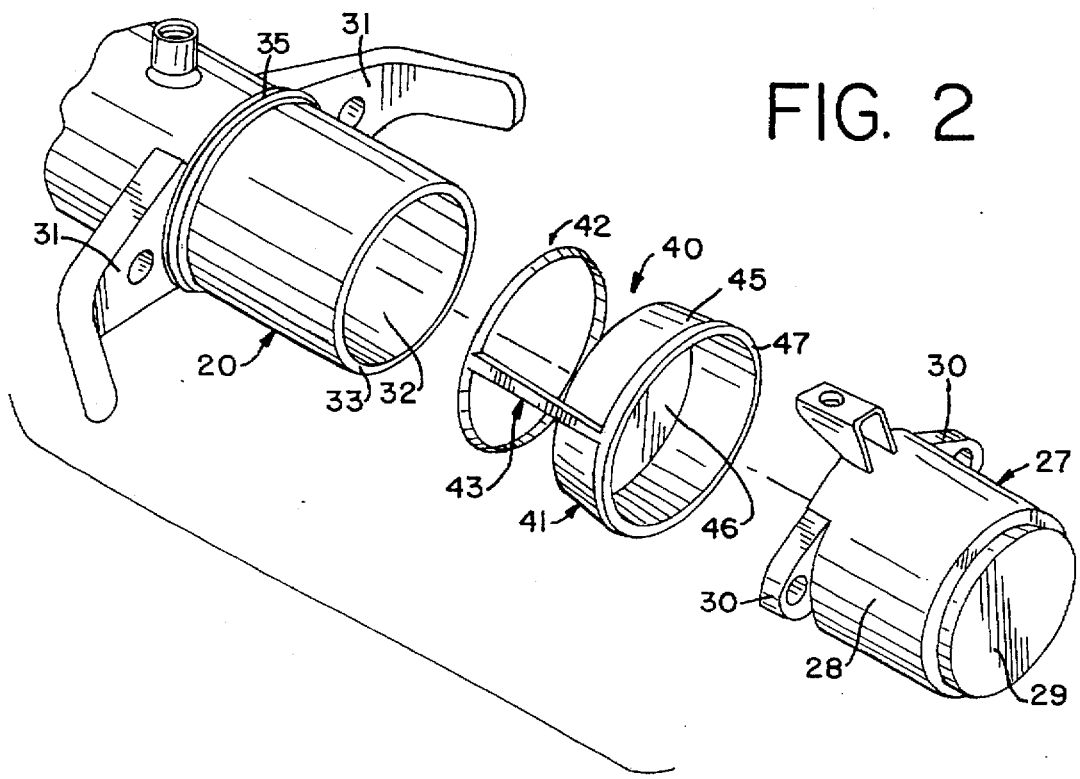
FIG. 2 is an exploded perspective view of a pneumatic discharge nozzle, the secondary seal of the invention and the outlet cap for the nozzle.
Figure 3:
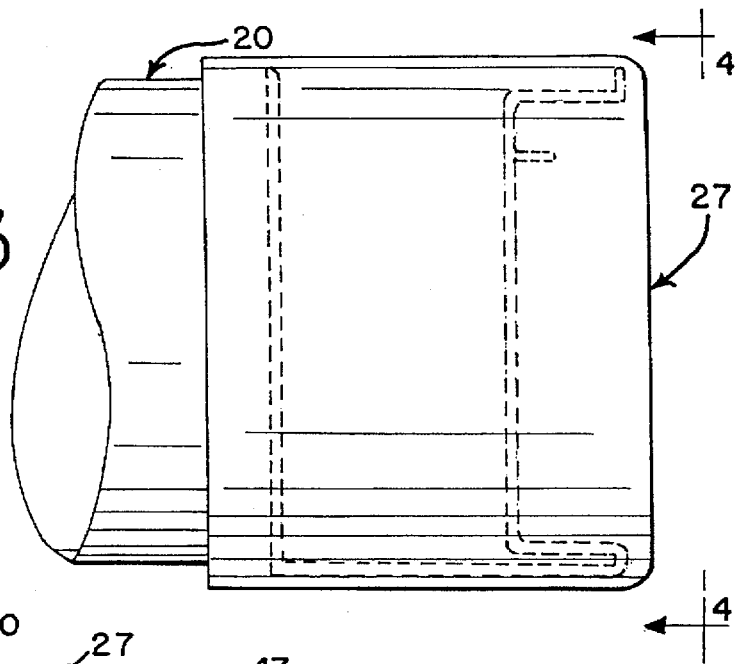
FIG. 3 is a fragmentary elevational side view of a pneumatic discharge nozzle illustrating the outlet cap in place and the secondary seal of the present invention in phantom.
Figure 5:
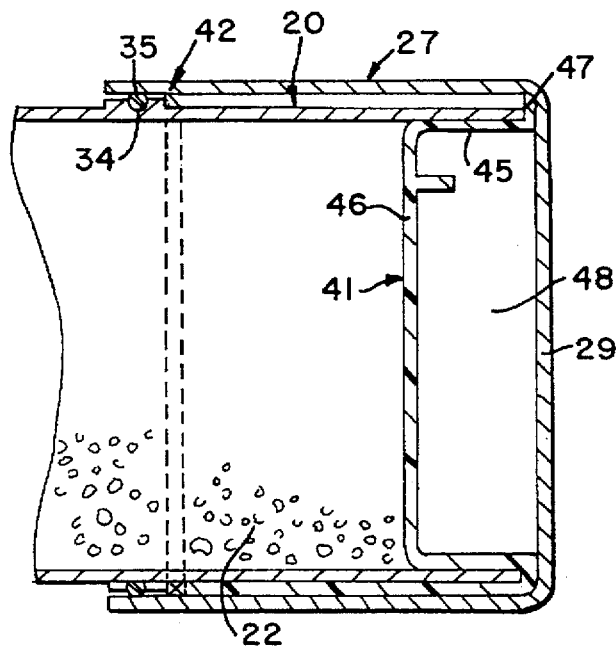
FIG. 5 is a perspective view of a discharge nozzle with the plug member of the secondary seal of the invention removed from the open end of the discharge nozzle and in tethered relation with the nozzle.

The secondary seal of the present invention is generally indicated by the numeral 40 in FIG. 2 and includes generally a plug member 41, a retaining ring 42, and a tether or connecting member 43 that interconnects the plug member with the retaining ring.

As seen particularly in FIGS. 2, 4, 6 and 7, the plug member 41 is hat-shaped or cup-shaped and includes a generally cylindrical side wall 45, an end wall 46 at one end of the side wall 45, and a peripheral lip or rim 47 at the open end of the plug member. While the lip extends around the entire periphery of the side wall 45, it will be appreciated it need not be continuous as long as sufficient lip means is provided to serve as a stop. Thus, the lip may be segmented and still perform to place the plug in a predetermined position. The secondary seal is preferably molded of a suitable flexible plastic such as polyethylene and would be of a cost that would allow the seal to be disposed of or recycled after being used. The plug member is formed to be matingly received within the open end of the discharge nozzle, as particularly seen in FIG. 4, wherein the cylindrical side wall 45 closely fits within the discharge nozzle and tightly engages the inner surface of the discharge nozzle to provide a sealing relation between the plug member and the discharge nozzle. This relationship prevents plastic pellets from entering the outlet cap and their spillage onto the track site when the cap is removed from the nozzle. When inserting the plug member, it is inserted into the open end of the discharge nozzle until the lip 47 abuts against the terminal edge 33 of the discharge nozzle. Thus, the lip acts as a stop to prevent the plug member from being inserted too far into the end of the discharge nozzle or otherwise drawn in by suction forces when unloading from the other side. In this manner, the lip functions to facilitate placing the plug member at a predetermined position relative to the end of the discharge nozzle.

The depth of the side wall 45 is such that it spaces the end wall 46 inwardly from the terminal edge of the nozzle to likewise space the plastic pellets 22 at such a distance from the end of the discharge nozzle that when the plug member is removed from the discharge nozzle, the plastic pellets will not spill out onto the track site, although they may move closer to the very end of the nozzle. In this respect, the function of the side wall of the plug member prevents the spillage of plastic pellets when the discharge nozzle is open, and the plug member is removed for purposes of connecting the nozzle to a tube or pipe to unload the contents of the hopper car. Further, the plug member 41 serves as a secondary seal to the O-ring gasket 35 to prevent the loss of plastic pellets from the discharge nozzle during travel of the hopper car and particularly to prevent the pellets from entering the outlet cap and being spilled from the cap as it is removed.

The plug member 41, by virtue of the end wall 46 being spaced inwardly of the end of the discharge nozzle, defines a compartment 48 with the outlet cap end wall 29 having sufficient room for the storage of papers identifying the contents of the car, and sample bags for receiving samples of the pellets when the car is shipped to a destination.

As seen in FIGS. 2 to 5, the retaining ring 42 is ring-shaped and will be sized to fit snugly over the end of the discharge nozzle 20 so that it will be frictionally held in place once the ring member is installed on the nozzle member. The ring member 42 will be automatically moved to a position along the discharge nozzle such that the tether 43 interconnecting the ring member with the plug member will still allow easy insertion of the plug member into the end of the discharge nozzle during the closing off of the end of the discharge nozzle with the secondary seal 40. While the cross section of the ring member may take any suitable shape, it is shown in FIG. 7 as being triangular in cross section so as to define an inner wall 50 that will fit and slide over the exterior surface of the discharge nozzle. By being triangular in shape and the wall 50 extending axially, the body of the member tapers radially to a sharp end point 51 to define a seal member. When the retaining ring is applied over the discharge nozzle and after the plug member is in place, the outlet cap can then be installed in place on the discharge nozzle and the inner surface of the cylindrical wall 28 of the outlet cap cad then somewhat crush down the tapered body of the retaining ring so as to define a further auxiliary seal between the outlet cap and the discharge nozzle as particularly seen in FIG. 4. Thus, an auxiliary seal is defined by shaping the ring member to fill the annular void between the exterior surface of the discharge nozzle and the internal surface of the outlet cap.

The tether 43 or connecting link between the plug member and the retaining ring may be of any suitable cross-sectional shape and is generally shown to be substantially rectangular in shape and extends from the periphery of the ring member to the periphery of the lip 47 of the plug member. This is the preferable manner in which the tether is interconnected between the ring member and the plug member, but it should be appreciated that it may be otherwise connected and still perform the function of attaching the plug member to the ring member so that when the plug member is removed at the end of the discharge nozzle, it will be tethered or connected to the discharge nozzle through the tether and the ring member.

In order to facilitate removal of the plug member from the end of the discharge nozzle, a tab or handle 53 is formed on the end wall 46 of the plug member which projects outwardly so that once the outlet cap is removed, the tab 53 is exposed so that it may be grasped to facilitate removal of the plug member from the discharge nozzle. It will be appreciated that any sort of tab means or handle may be provided in order to facilitate removal of the plug member from the discharge nozzle.

As particularly noted in FIGS. 6 and 7, it may be appreciated that the secondary seal may easily be injection molded so as to minimize the cost of making the secondary seal. However, it may be otherwise produced if desired.

Figure 8:
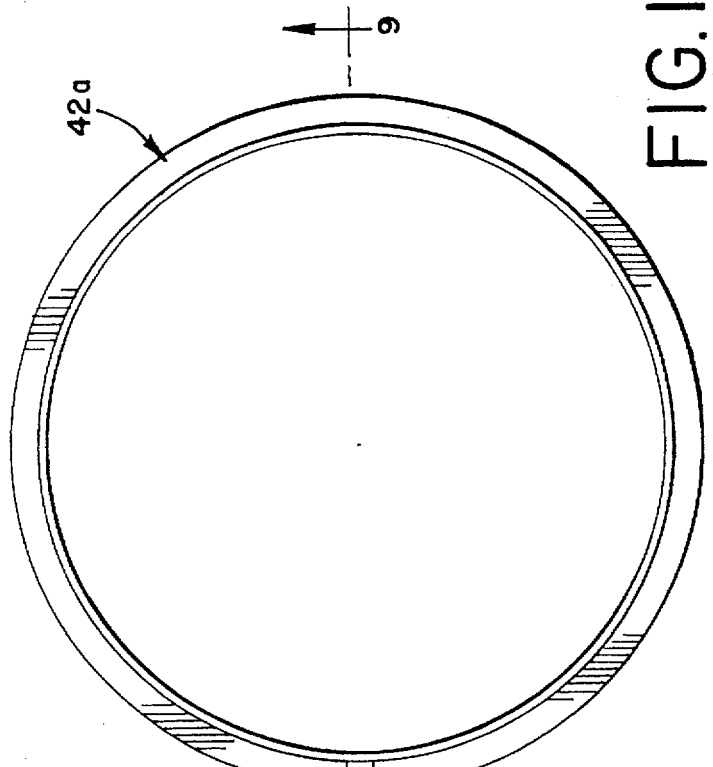
FIG. 8 is a modified secondary seal according to the present invention.
Figure 9:
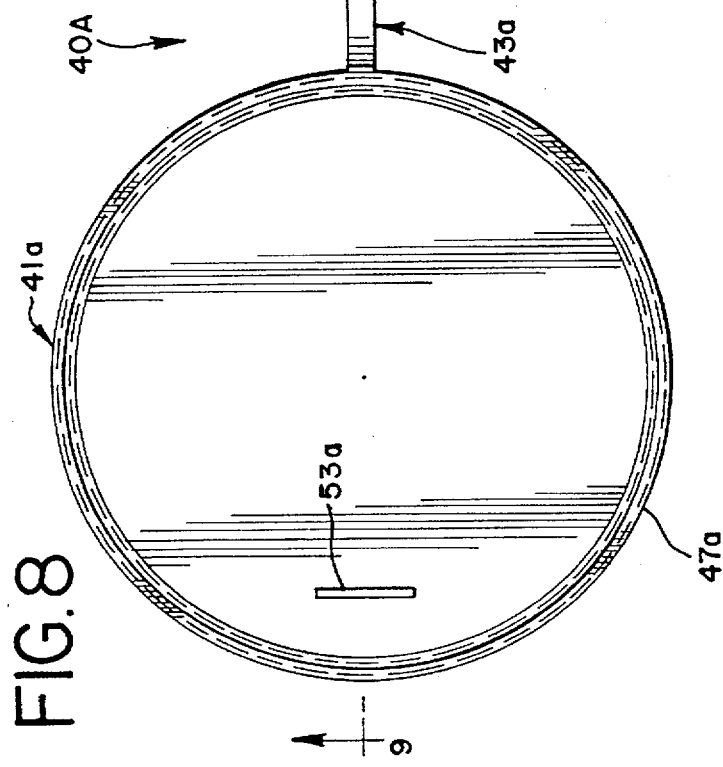
FIG. 9 is a sectional view taken through the secondary seal of FIG. 8 and substantially along line 9—9 of FIG. 8.
Figure 10:
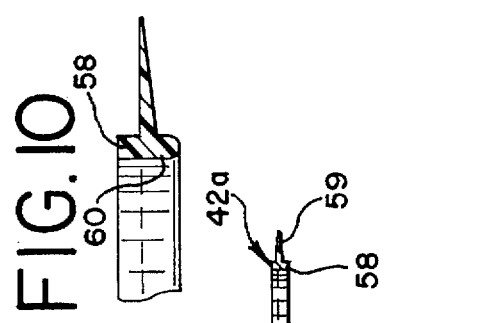
FIG. 10 is an enlarged fragmentary and sectional view of the ring-shaped retaining member of the secondary seal of FIG. 8.

A modification of the invention is shown in FIGS. 8 to 10, which differs from the embodiment of FIGS. 2 to 7 in that the retaining ring is formed to provide a radially longer sealing member as the auxiliary seal between the discharge nozzle and the outlet cap and the tether is in the form of a live hinge extending between the plug member and the retainer ring. This embodiment is generally indicated by the numeral 40A and includes a plug member 41a and a retainer ring 42a. A live hinge tether 43a interconnects the plug member to the retaining ring.

The plug member includes a cylindrical side wall 45a, an end wall 46a, and a lip 47a in the same arrangement as the secondary seal 40. Similarly, a tab or handle 53a is provided on the inside surface of the end wall 46a to facilitate removal of the plug member once it is installed in a discharge nozzle.

Unlike the rounded corner between the cylindrical wall 45 and end wall 46 of the plug member 41, a beveled wall 55 is provided between the end wall 46a and the cylindrical wall 45a to also function in guiding the insertion of the plug member into the discharge nozzle when it is being mounted on the discharge nozzle. With respect to insertion of the plug member 41a into the discharge nozzle, it will be accomplished in the same manner as the plug member 41 of the secondary seal 40 after the retaining ring has been properly positioned on the discharge nozzle.

The retaining ring 42a includes a body portion 58 that is generally rectangular in cross section as opposed to the triangular in cross section body of the retainer ring. An annular tapered seal member 59 extends radially outward from the body portion 58 to function as the seal member between the outlet cap and the discharge nozzle when the outlet cap has been applied to the discharge nozzle. Particularly, this feathered seal member will be bent over by the outlet cap once it is mounted on the discharge nozzle, and the memory of the plastic ring will cause a biasing relationship outwardly against the outlet cap to seal the area between the outlet cap and the discharge nozzle. When applying the retainer ring to the discharge nozzle, it will be appreciated that the inner wall 60 of the body portion 58 will mate with the outer surface of the discharge nozzle. Further, it will be appreciated that the fit will be such as to provide a snug relationship between the retainer ring and the discharge nozzle.

The live hinge tether 43a includes a semi-circular strap member 62 which is connected at one end to the lip 47a of the plug member and at the other end to the body portion 58 of the retainer ring 42a. The cross section of the strap 62 is generally rectangular, although it may take other forms. Being semi-circular in form and serving as a live hinge, it facilitates the positioning of the plug member into the open end of the discharge nozzle as well as retaining the plug member to the discharge nozzle once the plug member has been removed. It will be understood that the secondary seal 40A is also injection molded of a suitable plastic.

It will be understood that modifications and variations may be effected without departing from the scope of the novel concepts of the present invention, but it is understood that this application is to be limited only by the scope of the appended claims.

I claim:

1. In a covered hopper car for carrying granular material, wherein the car includes a substantially horizontally extending cylindrical pneumatic discharge nozzle connecting to the compartment and having an open end for discharging the material from the car, a cap for closing the open end of the nozzle, a seal on the nozzle coacting with the cap, the improvement being in a secondary seal device for preventing spillage of material when the device is removed from the nozzle to allow discharge of material from the nozzle, said device comprising a plug member matingly received in the open end of the nozzle and having means for maintaining material in such spaced relation from the open end of the nozzle upon removal of the plug member that spillage of material from the nozzle that previously leaked into the nozzle from the compartment is prevented, said plug member further including a cup-shaped body and lip means for engaging the terminal end of the nozzle to preposition the body when the device is fully inserted in the nozzle, said body being formed to mate with the nozzle and extend into the nozzle a given depth to prevent material within the nozzle and at the body from spilling out the open end of the nozzle, and a tab means on the body for grasping to facilitate removal of the plug member from the open end of the nozzle.

2. In a covered hopper car for carrying granular material, wherein the car includes a substantially horizontally extending cylindrical pneumatic discharge nozzle connecting to the compartment and having an open end for discharging the material from the car, a cap for closing the open end of the nozzle, a seal on the nozzle coacting with the cap, the improvement being in a secondary seal device for preventing spillage of material when the device is removed from the nozzle to allow discharge of material from the nozzle, said device comprising a plug member matingly received in the open end of the nozzle and having means for maintaining material in such spaced relation from the open end of the nozzle upon removal of the plug member that spillage of material from the nozzle that previously leaked into the nozzle from the compartment is prevented, said plug member further including a cup-shaped body and lip means for engaging the terminal end of the nozzle to preposition the body when the device is fully inserted in the nozzle, said body including a cylindrical wall mating with the cylindrical nozzle and an end wall, said lip means being at the open end of the cylindrical wall, and tab means on the body end wall for grasping to facilitate removal of the plug member from the open end of the nozzle.

3. In a covered hopper car for carrying granular material, wherein the car includes a substantially horizontally extending cylindrical pneumatic discharge nozzle connecting to the compartment and having an open end for discharging the material from the car, a cap for closing the open end of the nozzle, a seal on the nozzle coacting with the cap, the improvement being in a secondary seal device for preventing spillage of material when the device is removed from the nozzle to allow discharge of material from the nozzle, said device comprising a plug member matingly received in the open end of the nozzle and having means for maintaining material in such spaced relation from the open end of the nozzle upon removal of the plug member that spillage of material from the nozzle that previously leaked into the nozzle from the compartment is prevented, said plug member further including a cup-shaped body and lip means for engaging the terminal end of the nozzle to preposition the body when the device is fully inserted in the nozzle, retainer means for preventing the loss of the plug member when it is removed from the open end of the nozzle, said retainer means including a ring member slidably receivable on the nozzle and a strap interconnecting the ring member to the plug member, said ring member including seal means to coact with the cap and define a seal between the cap and nozzle, and tab means on the body for grasping to facilitate removal of the plug member from the open end of the nozzle.

4. In a covered hopper car for carrying granular material, wherein the car includes a substantially horizontally extending cylindrical pneumatic discharge nozzle connecting to the compartment and having an open end for discharging the material from the car, a cap for closing the open end of the nozzle, a seal on the nozzle coacting with the cap, the improvement being in a secondary seal device for preventing spillage of material when the device is removed from the nozzle to allow discharge of material from the nozzle, said device comprising a plug member matingly received in the open end of the nozzle and having means for maintaining material in such spaced relation from the open end of the nozzle upon removal of the plug member that spillage of material from the nozzle that previously leaked into the nozzle from the compartment is prevented, said plug member further including a cup-shaped body and lip means for engaging the terminal end of the nozzle to preposition the body when the device is fully inserted in the nozzle, retainer means for preventing the loss of the plug member when it is removed from the open end of the nozzle, said body including a cylindrical wall mating with the cylindrical nozzle and an end wall, and said lip means being at the open end of the cylindrical wall, and tab means on the body end wall for grasping to facilitate removal of the plug member from the open end of the nozzle.

5. In a covered hopper car for carrying granular material, wherein the car includes a substantially horizontally extending cylindrical pneumatic discharge nozzle connecting to the compartment and having an open end for discharging the material from the car, a cap for closing the open end of the nozzle, a seal on the nozzle coacting with the cap, the improvement being in a secondary seal device for preventing spillage of material when the device is removed from the nozzle to allow discharge of material from the nozzle, said device comprising a plug member matingly received in the open end of the nozzle and having means for maintaining material in such spaced relation from the open end of the nozzle upon removal of the plug member that spillage of material from the nozzle that previously leaked into the nozzle from the compartment is prevented, said plug member further including a cup-shaped body and lip means for engaging the terminal end of the nozzle to preposition the body when the device is fully inserted in the nozzle, retainer means for preventing the loss of the plug member when it is removed from the open end of the nozzle, said retainer means including a ring member slidably receivable on the nozzle and a strap interconnecting the ring member to the plug member, said ring member including seal means to coact with the cap and define a seal between the cap and nozzle, said body including a cylindrical wall mating with the cylindrical nozzle and an end wall, and said lip means being at the open end of the cylindrical wall.

6. The secondary seal device of claim 5, which further includes tab means on the body end wall for grasping to facilitate removal of the plug member from the open end of the nozzle.

7. In a covered hopper car having a compartment for carrying pelletized material, wherein the car includes a sequentially horizontally extending cylindrical pneumatic discharge nozzle connecting to the compartment and having an open end for discharging the material from the car, a hat-shaped cap for closing the open end of the nozzle, and seal means between the nozzle and the cap, the improvement being in a secondary sealing device for sealing the open end of the nozzle and preventing spillage of the pelletized material when the device is removed from the nozzle, said device comprising:

a plug member having a cup-shaped body matingly receivable within the open end of the nozzle to seal off the material from the ambient, a stop means including an annular lip engaging the terminal end of the nozzle and limiting the inserted position of said body within the open end of the nozzle, said body having a depth to limit the movement of material leaked into the nozzle from the compartment toward the open end of the nozzle such that upon removal of said plug member from the nozzle the material will not spill out the open end of the nozzle, a retaining means connecting the plug member to the nozzle when the plug member is removed from the nozzle, said body including a cylindrical wall mating with the cylindrical nozzle and an end wall, said stop means being at the open end of the cylindrical wall, said body forming a cavity with the cap for receiving sample bags and/or identification papers for the hopper car contents, and tab means on the body end wall for grasping to facilitate removal of the plug member from the open end of the nozzle.

\* \* \* \* \*